(12) United States Patent
Blersch et al.

(10) Patent No.: US 11,128,000 B2
(45) Date of Patent: Sep. 21, 2021

(54) HOUSING COVER AND HOUSING HAVING CONNECTION POINT

(71) Applicant: REINZ-DICHTUNGS-GMBH, Neu-Ulm (DE)

(72) Inventors: Robert Blersch, Baltringen (DE); Dieter Grafl, Ulm (DE); Andreas Michalke, Neu-Ulm (DE); Bernd Ruess, Voehringen (DE)

(73) Assignee: Reinz-Dichtungs- GmbH, Neu-Ulm (DE)

(*) Notice: Subject to any disclaimer, the term of this patent is extended or adjusted under 35 U.S.C. 154(b) by 299 days.

(21) Appl. No.: 16/468,365

(22) PCT Filed: Dec. 14, 2017

(86) PCT No.: PCT/EP2017/082735
§ 371 (c)(1),
(2) Date: Jun. 11, 2019

(87) PCT Pub. No.: WO2018/109055
PCT Pub. Date: Jun. 21, 2018

(65) Prior Publication Data
US 2019/0348642 A1    Nov. 14, 2019

(30) Foreign Application Priority Data

Dec. 14, 2016  (DE) .................... 20 2016 106 940.8

(51) Int. Cl.
*H01M 50/10* (2021.01)
*H01M 50/20* (2021.01)
*H01M 50/24* (2021.01)

(52) U.S. Cl.
CPC .......... *H01M 50/10* (2021.01); *H01M 50/20* (2021.01); *H01M 50/24* (2021.01)

(58) Field of Classification Search
None
See application file for complete search history.

(56) References Cited

U.S. PATENT DOCUMENTS

2004/0137321 A1    7/2004  Savaria
2016/0218335 A1    7/2016  Baek

FOREIGN PATENT DOCUMENTS

DE    102009034141    1/2011
DE    202016106940    3/2018

OTHER PUBLICATIONS

European Patent Office, International Search Report with Written Opinion issued in PCT/EP2017/082735, dated Apr. 18, 2018, 16 pages, European Patent Office, Rijswijk, Netherlands.

*Primary Examiner* — Wyatt P McConnell
(74) *Attorney, Agent, or Firm* — Marshall & Melhorn, LLC

(57) ABSTRACT

A housing cover and a housing are disclosed, which may be used in automotive vehicle construction. There, they serve for example for the purpose of offering protection to a sensitive component or to a group of components, for example a traction battery in the electric car, and, conversely, of protecting the environment from the component or the group of components or for example from electromagnetic radiation emanating from the component.

23 Claims, 12 Drawing Sheets

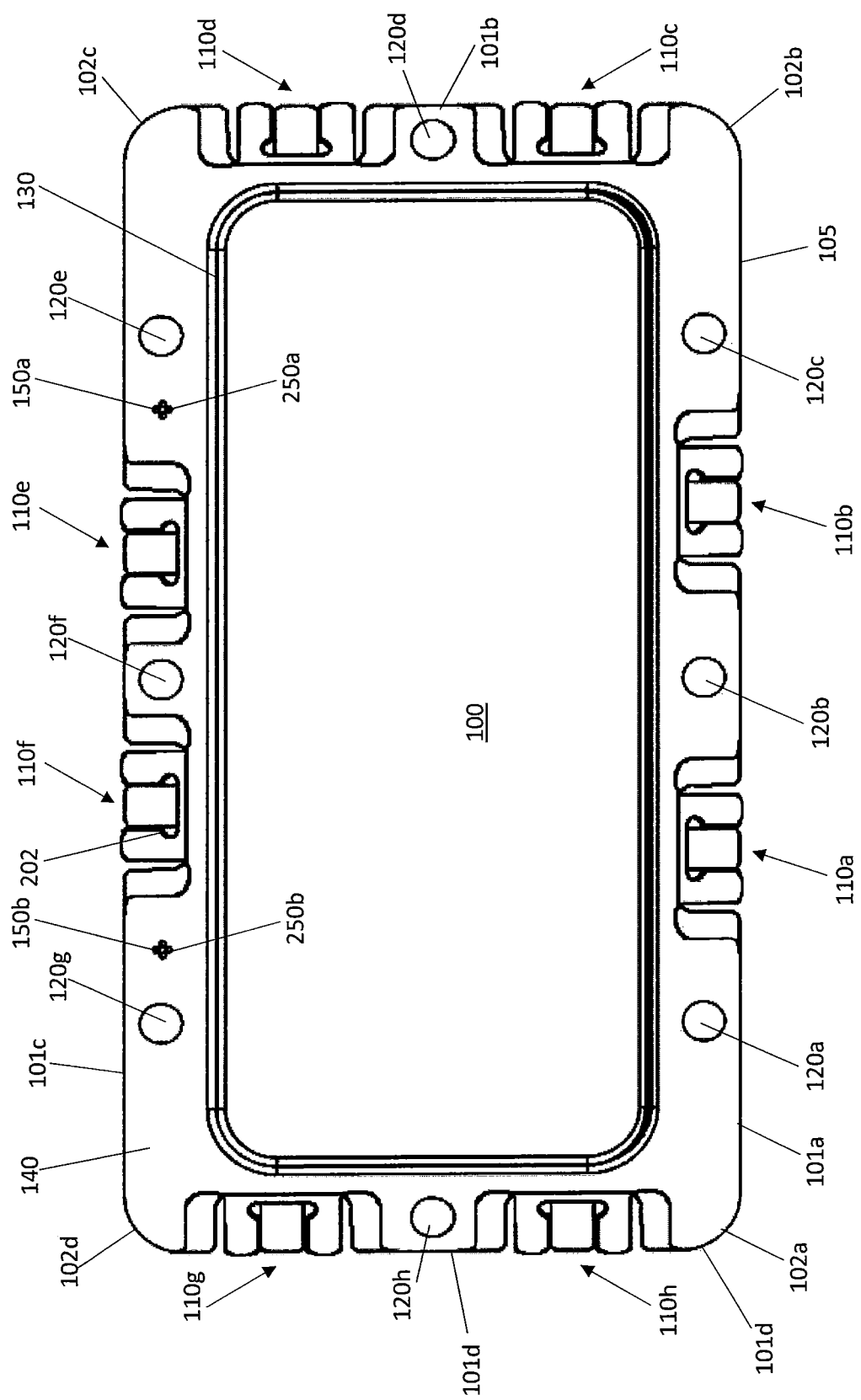

HOUSING COVER AND HOUSING HAVING CONNECTION POINT

BACKGROUND

The present invention relates to a housing cover and to a housing. Such housing covers and housings are used in particular in automotive vehicle construction. There, they serve for example for the purpose of offering protection to a sensitive component or to a group of components, for example a traction battery in the electric car, and, conversely, of protecting the environment from the component or the group of components or for example from electromagnetic radiation emanating from the component.

Conventionally, metals are used for the housings. The housing cover thereby has an edge region which, for closure of the housing, comes to lie on a flange provided on the housing lower part. Housing cover and housing lower part can be connected together on this flange, integrally, in a form-fit and/or frictionally. The housing cover thereby usually consists of an individual layer, however it can also consist of a plurality of layers. In principle, a housing can also have a plurality of such housing covers closing it.

In order to prevent an undesired material transition between housing interior and environment, for example penetration of water into the housing interior or escape of oil from the housing interior, in addition particular sealing elements can be provided between housing cover and housing lower part or base. The sealing function between the housing parts is ensured conventionally by a sealing cord which, generally, is inserted into a circumferentially configured groove on one of the housing parts. Normally, such seals have an essentially round or at least rounded-off cross-section and consist of elastomeric materials.

What is disadvantageous in such conventional seals and housing parts is that these seals generally require to be inserted by hand in the provided grooves. In addition, a comparatively large amount of sealing material is required. This makes the assembly process and the seal expensive and complex.

Instead of sealing cords, the use of coatings is also possible. These are used in a comparatively thin layer and possibly in combination with sealing beads. Conventionally, complete-surface or essentially complete-surface precoated sealing layers or materials can be used for this purpose for manufacture. The use of such layers or materials prevents however, in general, the electrical conductivity between the individual layers or materials. Therefore, when using these precoated layers or materials, it is necessary to form electrically conductive contacts for functional and/or protective earthing, in particular also legal regulations with respect to sufficient contact points for ensuring electromagnetic compatibility requiring to be implemented technically. Even if instead of a complete-surface coating only a coating in regions is present, generally electrical contacts, in particular for ensuring the electromagnetic compatibility, are required also in the coated region.

The object therefore underlying the invention is to make available a simple and economic sealing construction with one or more likewise simple and economic electrically conductive connecting points between housing cover and housing lower part, which can be used reliably at different places.

This object is achieved by the housing cover according to claim 1 and also the housing according to claim 20. Advantageous developments of the housing cover according to the invention and of the housing according to the invention are provided in the dependent claims.

SUMMARY

The housing cover according to the invention has at least one first layer comprising electrically conductive material or consisting of the latter with an edge region, which extends along the circumferential edge of this layer. The edge region is thereby that region of the housing cover which extends in plan view on the layer plane along the outside of the housing cover, i.e. along the outer circumferential edge. The housing cover has in addition a second layer which is configured circumferentially at least along the edge region. Finally, the housing cover according to the invention has at least one connecting point in its edge region in which the first layer has at least one material recess such that a web is configured in it or through it. In a second layer, a through-opening is provided adjacent to this web perpendicular to the layer plane.

Such a housing cover offers the possibility of production, by reshaping, in particular deflecting, bending or embossing, of the web in the direction of the flange of the housing, of an electrically conductive connecting point between cover and housing lower part which is producible in a robust, simple manner and without additional parts. In addition—possibly in combination with the housing lower part—a form-fit connection between a plurality of layers of the cover, i.e. the cover layers, can advantageously be ensured in a simple manner. The connecting point according to the invention in addition comprises no laterally protruding components and/or sharp or pointed edges, as a result of which the danger of component damage and also the danger of injury to persons is reduced.

A development in which only a single material recess exists at a connecting point is suitable in particular for the connection in the region adjacent to an outer edge since the one side of the web is hereby formed by the recess, the other however by the outer edge itself. As a result, a very simple and economic possibility for configuring a web and hence for connection in the edge region is produced.

In another development of the invention, the first layer has two material recesses at at least one connecting point, between which recesses a web is configured. Such an embodiment can be used both for a connecting point which is disposed directly adjacent to an outer edge, for example the outer circumferential edge, and for a connecting point which is not disposed directly adjacent to an outer edge.

In a development in which the connecting point is directly adjacent to an outer edge, the recesses can be configured directly at the outer edge of the cover so that a recess which is completely surrounded by the cover in plan view on the cover is not produced, but rather a recess which is surrounded only partially by the cover, i.e. a form of outer circumferential edge which is not straight but rather is bent, curved or bulging. Consequently, a web is produced between the recesses and is disposed directly at the outer circumferential edge. Such a web continues therefore only at one end into a region which is likewise part of the first layer but not part of the web. At its other end, the web ends, i.e. the end of the web forms an edge of the outer circumferential edge at this side. In this development, particularly simple reshaping, in particular by angling-off, bending or offsetting, of the web is possible.

If the connecting point is configured in such a way that it is not directly adjacent to the outer circumferential edge, the material recesses can be surrounded completely by the cover, in plan view on the cover. Here the web is likewise formed between the material recesses, however it continues at both its ends into a region which is likewise part of the first layer but not part of the web so that no end of the web forms a part of an outer edge of the cover. Such a web can be deformed in order to form an electrically conductive contact, in particular by pressing or embossing, with hence accompanying lengthening of the web. Such a development is particularly advantageous since it enables a particularly flexible arrangement of the connecting points, which enables in particular also an arrangement which is not directly on an outer edge.

In an advantageous embodiment, the through-opening of the second layer is configured in the direction perpendicular to the layer plane of the first and second layer and thereby adjacent to the web. The through-opening is thereby disposed advantageously directly behind the web, in plan view on the layer planes. As a result, the possibility is provided of reshaping the web such that it passes through the through-opening at least in portions. This makes it possible to form the electrically conductive connection between both housing halves, as is evident from subsequent embodiments.

In a further configuration of the invention, the web of the first layer of the housing cover is already reshaped in advance. In particular the reshaping of the web can concern deflecting, bending or embossing which results in a shape of the web which is bent once or multiple times, in particular in an offset form. The reshaping, in particular embossing, can thereby also lead to lengthening of the web which increases the length of the neutral fibre of the web, viewed in cross-section through the first layer. By means of the reshaping, the web extends, at least in portions, viewed from the first side, with at least one of its surfaces behind all of the further layers of the housing cover. At least the side of the web, orientated away from the first layer, thereby extends at least partially behind all of the further layers of the housing cover and/or behind the corresponding surface of the first layer outside the web. Also the side of the web, orientated towards the first layer, can however extend to behind the further layers of the housing cover, and/or behind the plane of the first layer outside the web. Viewed in cross-section, the neutral fibre of the reshaped web can therefore be situated inside the plane of the second layer or below it. A web reshaped in advance is particularly advantageous because the web need not be reshaped in a further method step in order to form the electrically conductive connection between the housing halves.

Particularly advantageously, as a result of the reshaping, the web has an advantageously straight portion which protrudes out of the plane of the first layer and extends at an obtuse side angle between 120° and 170°, preferably between 140° and 170°, further preferably between 155° and 10°, further preferably between 160° and 165°, relative to the plane of the first layer. The side angle is thereby that angle which spans between the plane of the first layer and the plane of the adjacent protruding portion. A region which extends in turn parallel to the plane of the first layer can abut on this angled region so that the edge of this former region is offset in total relative to the plane of the first layer. This embodiment enables a simple connection of the housing halves (cover and lower part) with good electrical conductivity between the housing halves.

In a further possible embodiment of the invention, a free edge of the reshaped web, i.e. for example that side of the web which, in the undeformed state, is part of the surface of the first layer orientated away from the second layer, extends, at least in portions, behind a region of the second layer which was embossed after forming the web such that the web extends, viewed from the first side, at least in portions behind the embossed region of the second layer and engages behind the latter in order to produce a positive fit acting perpendicular to the layer plane. In particular, the embossing of the second layer thereby results therefore in lateral widening or extension of the second layer which causes the positive fit. Alternatively, also the web can finally be deformed such that it engages behind at least one adjacent free edge, in plan view on the layer plane, possibly both adjacent free edges of the second layer situated one opposite the other.

In addition, the second layer adjacent to the through-opening of the second layer can be reshaped, in particular offset, such that it extends offset relative to the remaining layer plane in portions. The neutral fibre of the second layer in this region can thereby be situated inside the first layer, for example at least partially, viewed in cross-section. The second layer is thereby embossed at the side for example such that at least one free edge of the web extends at least in portions, viewed from the first side, behind the embossed region of the second layer and engages behind the latter in order to produce a form-fit acting perpendicular to the layer plane. A comparable form-fit can also be effected by widening the web, for example by embossing.

The form-fit resulting from the embossing of the first and/or second layer can therefore produce a preliminary connection of the individual layers of the cover. For example such a connection can serve for holding together the layers of the gasket during transportation or to ensure a temporary retention and temporary positioning before the final joining of the individual layers to each other.

When connecting housing cover and housing lower part, a pressure force can be exerted which ensures, on the one hand, sufficient surface pressure between the housing parts and, on the other hand, presses the reshaped webs onto the housing lower part. As a result, an elastic or plastic-elastic recovery of the webs in the direction of the first layer of the housing cover is effected and the housing halves are connected to be electrically conductive.

In an advantageous development, the first and the second layer are connected together in the edge region, by a force-fit, frictionally, a form-fit and/or integrally such that a sealed connection is present. In a particularly advantageous development, the first two layers are sealed here by welding and/or sealed by soldering. This has the advantage that a sealed connection is produced between the layers which are welded and/or soldered together. The background thereof is that, in the case of different applications—for example in the interior of the housing—oil can be situated and used for example for cooling electronic components. This relates in particular to additional housing covers which cover oil-filled partial compartments within a housing. These can be combined with a further housing cover which closes the housing lower part in total which can be filled only in partial compartments with oil. Generally, various additives are added to the oil which comprise sulphurous components, sulphurous compounds and/or sulphur or consist thereof. Conventional sealing compounds, for example many elastomeric coatings, are permeable relative to such sulphur compounds. This means that components of sulphurous additives can diffuse, partially or completely, through conventional sealing compounds. In order to prevent this undesired material crossover, a connection sealed by welding, i.e. a weld seam or weld connection, is particularly well suited. By means of sealing by welding of the layers, the escape of sulphur compounds can therefore be reduced particularly well. Such weld connections can then replace further sealing means, for example coatings between the layers which are welded together. The weld connection in addition joins together the layers.

A possibly present weld connection does not however replace the electrically conductive contactings according to the invention at different places which are required to make available sufficiently electrical contacts to the housing lower part and to fulfil the requirements of electromagnetic compatibility.

The geometry of the web permits any variability. Advantageously, the web can have a straight, curved, round, square, oval or other outer contour, in plan view on the first layer. The web can be advantageously configured, in plan view on the plane of the first layer, mirror-symmetrically relative to its longitudinal axis, the longitudinal axis being the axis extending in the direction of the web, and/or mirror-symmetrically relative to its transverse axis, the transverse axis extending perpendicular to the longitudinal axis, or even point-symmetrically relative to the centre of the web or to another point of the web. Such symmetrical webs and symmetrical connecting points enable a particularly simple configuration of the tool, particularly simple handling.

In an advantageous embodiment, the first layer of the housing cover comprises metal or consists of the latter and has a reinforcing bead as full bead or half bead/offset which is configured preferably circumferentially along and/or offset relative to the outer edge of the cover. As a result, the bending- and torsional rigidity of the housing cover is increased, as a result of which the danger of deformation of the housing cover is reduced. As a result, also a problem-free assembly of the housing cover and a long-term fitting seat on the housing lower part is ensured with high system sealing. Possibly the region between the reinforcing bead and the outer circumferential edge of the first layer can thereby form the edge region of the first layer.

The housing cover can be configured advantageously such that at least one metallic layer of the housing cover has a bead, in particular a sealing bead, which, observed in the direction perpendicular to the layer plane, is disposed circumferentially adjacent to the edge region along the circumferential edge of the first layer. This sealing bead is advantageously configured in the second or in one of the additional metallic layers and, in the case of a full bead, advantageously points away from the first layer with its bead top. Advantageously, the layer comprising the sealing bead is configured from a spring-hard and hence elastic material.

The possibility of a connection of the housing halves is achieved in an advantageous development in which, in the edge region, at least one through-opening penetrating all layers of the housing cover is provided for fixing means, in particular a screw hole. As a result, a possibility for permanent connection of housing cover and housing lower part with detachable or non-detachable connecting means, such as screws or rivets, is produced, which enable sufficiently high pressure force between the housing parts. By using one or more through-openings, an improved, in particular more uniform, sealing effect is achieved if at least one, several or all of the through-openings are configured outside the region surrounded by a circumferential sealing bead or by at least one sealing line or sealing bead. As a result, it is ensured that a material crossover between the interior of the housing and the environment cannot be effected via the path of the screw opening either or that an undesired passage of a material between housing interior and environment cannot be effected without the sealing bead requiring to be passed. If the possibility of a material crossover is however desired constructively, then openings—for example in the first layer—can be provided inside the region enclosed by the bead, as is portrayed in a development cited later.

The embodiments of the housing cover can advantageously also have additional layers or coatings, in particular in the edge region of the housing cover. In general, the first layer is thereby that layer which, in the closed state of the housing, i.e. in the state in which housing cover and housing lower part are connected together, points outwards and hence generally upwards. The additional layers are correspondingly fitted normally, but not necessarily, on the side of the housing cover which is orientated towards the housing lower part in the closed state.

The additional layers can fulfil different functions from each other. In order to achieve an increased sealing effect, for example distance layers and sealing layers can be provided and combined together. At least one additional layer can thereby consist for example of a metal but also of an insulating material, in particular made of polytetrafluoroethylene (PTFE). Beads can thereby be configured on one or more additional metal layers in order to improve the sealing effect.

In an advantageous development, at least the first and/or the second layer is thereby coated to be electrically insulating or electrically insulating, at least in regions. A coating, in regions, of a metallic layer can be used for example when merely the sealing bead is coated. The result hereby in the region of the macroscopic sealing with at least one (half bead) or for example two (full bead) sealing lines, is in addition a microscopic seal. The insulating coating can thereby advantageously be situated on the side of the first layer orientated towards the second layer and/or on the side of the second layer orientated towards the first layer. Such sealing layers or coatings between the housing layers are advantageous in particular when the cover layers are not sealed by welding. The lower the configuration of the layer thickness of the coating, the lower is the risk of diffusion through the coating, however a minimum thickness is required for the sealing effect. Furthermore, the sealing layer or coating can be situated on the side of the second layer orientated away from the first side in order to achieve an advantageous sealing effect between housing cover and housing lower part. As a result of the various developments, a system-compatible seal between the cover layers and/or the other housing parts can be effected.

In a further advantageous embodiment, there is disposed, at least between the edge region of the first layer, i.e. the outside of the cover, and the second layer, for example the sealing layer of the cover, a third layer made of a gas-permeable material perpendicular to the layer plane, wherein, in the edge region, possibly inside a region surrounded by a circumferential bead, the first layer has at least one through-opening and the second layer has a recess which extends from the (inner) region surrounded by the edge region to below the through-opening in the first layer. The recess in the second layer is thereby recessed normally in the complete thickness of the second layer, i.e. in the total thickness of the layer perpendicular to the layer plane.

Advantageously, a plurality of small, adjacent through-openings can thereby be provided in the first layer, as a result of which the danger of damage to the layers situated below, in particular the third layer, i.e. to the gas-permeable material or the gas-permeable layer, is reduced.

If sealing beads are provided in one of the layers, then through-openings serving for ventilation are advantageously disposed inside the region surrounded by the sealing bead, i.e. the bead or at least one of its sealing lines includes the through-openings or the through-openings are situated between the sealing bead and the housing interior.

Such an embodiment enables ventilation of the housing at the position of the through-opening without there being a danger of entry of liquid water or water-similar liquids into the housing. A gas exchange between the housing interior and the environment can hereby take place since a gas-permeable and/or water vapour-/moisture-permeable path is provided, which leads through the through-opening in the first layer, i.e. the outer layer, through the gas-permeable material, via the recess of the second layer, i.e. for example of the sealing layer of the cover, towards the interior of the housing. For liquid water or water-similar liquids, in contrast, this path is blocked by a gas- and moisture-permeable, but water-impermeable material, for example PTFE. In addition, escape of toxic materials into the environment can be prevented or restricted, for example the diffusion of sulphurous compounds.

The third layer can thereby extend basically in the total region between the first and second layer. In an advantageous development, the third layer, in the region of the at least one connecting point, has respectively one through-opening which is disposed perpendicular to the layer plane of the first and second layer and also adjacent to the web of the first layer, for example below the web, and to the through-opening of the second layer. According to the property of the third layer, the electrical conductivity is improved or made possible at all by the through-opening. If a through-opening is premanufactured, a subsequent, possibly necessary machining step can therefore be omitted, as a result of which not only does simplification arise but also the formation of residues between the layers is prevented.

However, it is also conceivable that no pre-prepared through-opening for the web is necessary, e.g. if, during reshaping, in particular during bending or embossing, of the web, a through-opening is produced through the third layer, e.g. by the web being pressed through the third layer. Likewise, no premanufactured through-opening is required in the third layer if, during reshaping, in particular during bending or embossing, of the web, a separate manufacturing step is provided which configures a through-opening in the third layer.

If the cover layers are welded together, then the third layer is configured advantageously at a spacing from the outer circumferential edge of the edge region and hence from the surface to be welded or from the weld seam. In other words, the third layer has a circumferential recess along the outer circumferential edge of the edge region and does not extend completely to the outer edge of the edge region in order to prevent impairment to the weld connection and to the third layer.

In general, the third layer need not extend up to the outer edge of the housing cover but rather can have a smaller outer extension. Also in this way, it can be achieved that the third layer does not influence the electrical contacting via the connecting points.

In an advantageous embodiment, the third layer comprises or consists of a membrane made of polytetrafluoroethylene (PTFE).

In plan view on the layer planes, the contour of the cover can assume any geometric shape which is coordinated with the constructional space present and also with other components or component groups. In particular, the cover need not be configured point-symmetrically, rotation-symmetrically or mirror-symmetrically.

Advantageously, the second layer is configured as a frame or frame-shaped. The inner circumferential edge of the second layer thereby preferably delimits the inner region of the housing cover.

Advantageously, the second layer has a material thickness of less than or equal to 0.3 mm, preferably of less than or equal to 0.2 mm, particularly preferably of less than or equal to 0.1 mm. The second layer hence offers the possibility of configuring sealing beads which have an advantageous spring behaviour.

Advantageously, the first layer of the cover has a material thickness of less than or equal to 0.5 mm, preferably greater than or equal to 0.7 mm, particularly preferably greater than or equal to 0.8 mm and/or advantageously a material thickness of less than or equal to 2.0 mm, preferably less than or equal to 1.3 mm, particularly preferably less than or equal to 1 mm.

Coatings, in particular elastomeric coatings, advantageously have a thickness of greater than or equal to 2 µm, preferably greater than or equal to 4 µm, particularly preferably greater than or equal to 5 µm and/or advantageously a material thickness of less than or equal to 30 µm, preferably less than or equal to 15 µm, particularly preferably less than or equal to 7 µm.

The initially described object is achieved in addition by a housing according to claim 20. The housing according to the invention thereby has a housing lower part with a circumferential flange in the closure plane of the housing, and also a housing cover in one of the described embodiments, the housing cover being supported by its edge region circumferentially at least in regions on the flange and being connected to the flange.

The initially presented object is thereby achieved according to the invention by the web of the first layer being configured at at least one connecting point, in particular reshaped, in particular, deflected, bent or offset, such that it passes through the through-opening of the second layer at least in portions, touches the flange of the housing lower part and connects together the web and the flange to be electrically conductive.

Such a housing with such a housing cover and such a housing lower part enables a constructively non-complex electrically conductive connection between housing cover and housing lower part for the purpose of the housing earthing. As a result, a particularly simple form of the electrically connective connection is produced since no additional components and protruding connecting elements are required. The thus formed connection is consequently producible economically and causes no volume- or weight increase, but rather leads even to a reduction in volume and weight. In addition, it is possible to choose the number of contact points in a flexible manner so that the number of connecting points can be designed, in particular also with consideration of legal specifications, with respect to the electromagnetic compatibility and to specifications of requirements.

Advantageously the web thereby touches the flange on the planar end-side of the flange which extends parallel to the layers of the housing cover. As a result, the connecting point, in particular the web used for this purpose, is damage-proof without protruding components in the through-opening of the second layer provided for this purpose and hence disposed in the housing cover. As a result, catching with other components and/or component groups is extensively prevented.

In an alternative embodiment, the edge region of the housing cover has a projection, i.e. an excess, at least in regions, relative to the flange, so that a connecting point according to the invention is configured in this region, i.e. the projecting region or the excess region. In this case, the reshaped web cannot touch the flange at its end-side but rather at the side, i.e. at the outer circumferential side or at that side which points away from the housing interior. Such an embodiment is then used advantageously if the arrangement surface available for the connecting point according to the invention is delimited.

In an advantageous embodiment, housing lower part and housing cover are connected together by means of detachable connecting elements, in particular screws, in the flange region.

If the connecting point is intended to serve, in addition to the earthing function, also for temporary or permanent connection of the layers, it is advantageous if at least two connecting points, the webs of which extend in different directions, are disposed in the layer plane of the first layer at a spacing from each other. During embossing of the first and/or second layer, a form-fit connection between the cover layers which fixes the layers is hereby produced. During force effect on the housing cover, the force component acting in the direction of the longitudinal axis of the webs is thereby prevented primarily from being received by the laterally embossed regions of the first and/or second layer. Hence, an excessively high loading of the laterally embossed regions of the first and/or second layer during force effect is prevented.

In the following, some examples of housing covers according to the invention are provided, the same or similar elements being provided with the same or similar reference numbers. The description thereof is therefore possibly not repeated. Furthermore, the subsequent embodiments comprise a large number of advantageous developments and features which however also as such per se, without being considered in combination with the further advantageous features of the respective embodiment, are suitable for development of the present invention. Also combinations of individual features of different embodiments are readily possible as advantageous developments.

BRIEF DESCRIPTION OF THE DRAWINGS

There are shown

FIG. 2a a plan view on a cover with connecting points according to the invention;

DETAILED DESCRIPTION

Figure 1A:
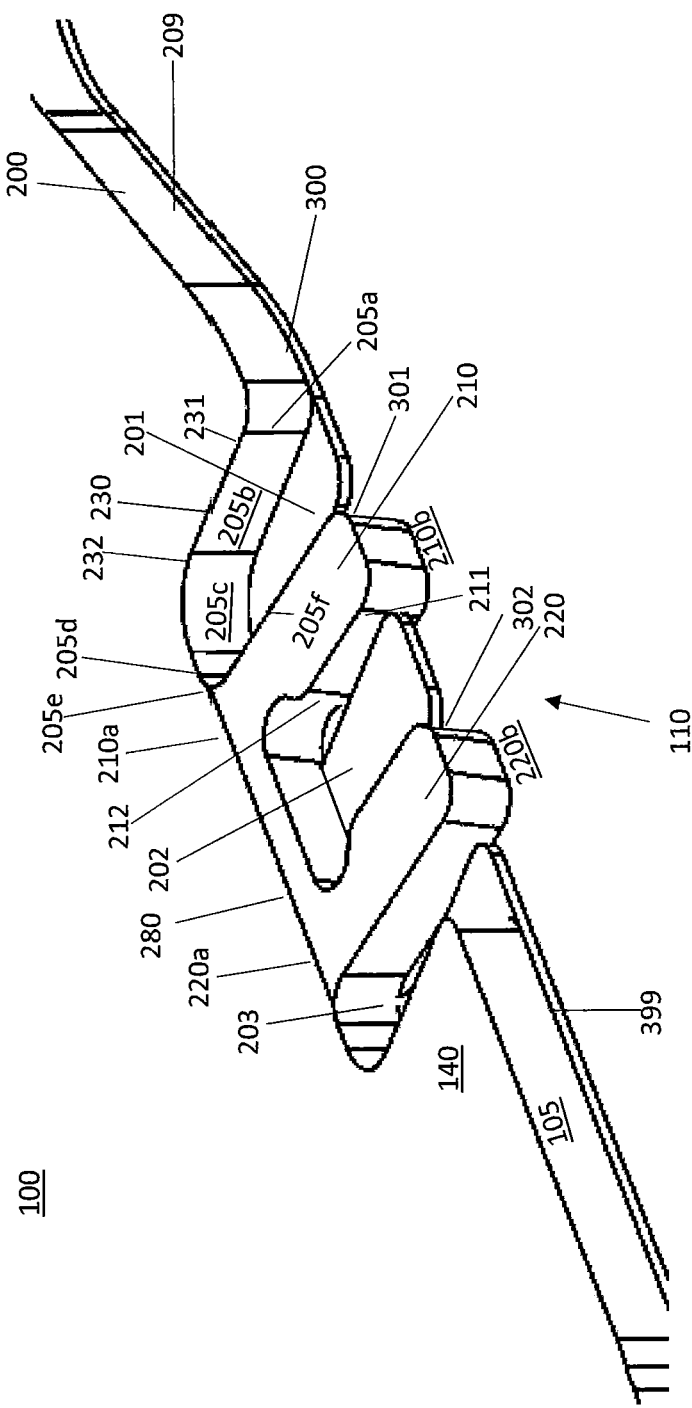
FIG. 1a, 1b respectively a diagonal view of a connecting point according to the invention, configured at the outer circumferential edge of the cover.
Figure 1B:
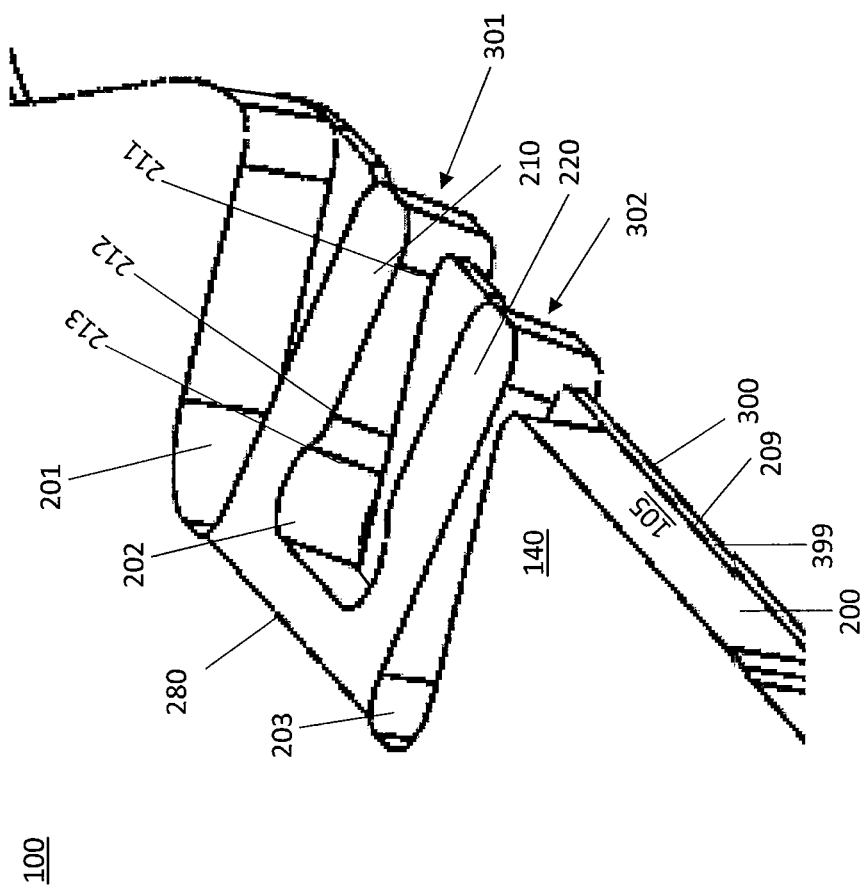

FIGS. 1a and 1b show diagonal plan views on a connecting point 110 according to the invention which is configured in the edge region 140 of a cover 100, from a different perspective. Here, a first layer 200 with a planar abutting second layer 300 is present, the first layer 200 being configured substantially thicker than the second layer 300. The first layer has, at three places along the outer circumferential edge 105 of the cover 100, recesses 201, 202, 203 so that two essentially parallel extending webs 210, 220 are formed between the three recesses 201, 202, 203, the longitudinal extension of the webs extending respectively essentially orthogonally to the non-recessed region of the outer circumferential edge 105. Here, the two webs 210, 220 extend therefore such that respectively one end 210a, 220a of the webs 210, 220 merge into a region which is part of the first layer but not part of the web. The respectively other end of the webs 210, 220, in contrast, forms a part of the outer circumferential edge 105, i.e. this end of the webs 210, 220 abuts on a region 210b, 220b which is not part of the first layer 200. The recesses 201 of the first layer 200 have, at their sides, planar portions 205b, 205d, 205f and arcuate portions 205a, 205c, 205e which are disposed alternately adjacent to each other on the outer circumferential edge 105. The border between planar portions 205b, 205d, 205f and arcuate portions 205a, 205c, 205e is characterised, in FIGS. 1a, 1b, by edges extending orthogonally to the layer plane, for example edges 231, 232. The other recesses 202, 203 of the first layer have, at their sides, likewise planar and arcuate portions with edges separating these from each other, for example the edges 211, 212, 213. The second layer 300 now has, at the outer circumferential edge 105, two recesses 301, 302 which are situated below the webs 210, 220 of the first layer 200, in plan view on the first layer 200.

Furthermore, the webs 210, 220 are bent-off in the direction of the second layer 300 such that the surface 209 of the first layer 200, orientated towards the second layer 300, is situated in the region of the web respectively, viewed from the first layer 200, at least in regions behind the plane 399 or the neutral fibre of the second layer 300.

Figure 1C:
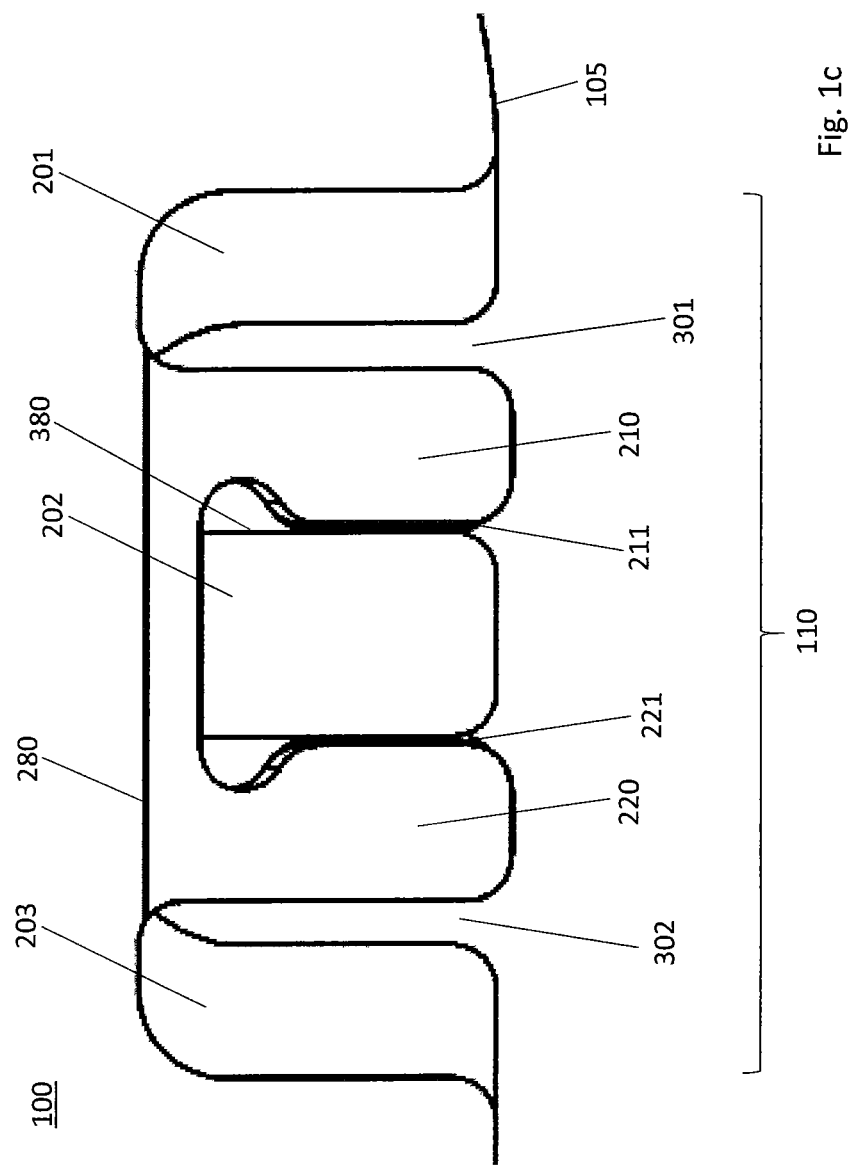
FIG. 1c a plan view on a connecting point according to the invention.

FIG. 1c shows a plan view on the previously described connecting point 110 according to the invention. Here, the contour of the recesses 201, 202, 203, 301, 302 and the line 280 at which the angling-off of the webs 210, 220 of the first layer 200 begins can be detected here particularly well. Furthermore, it is evident that the free edges 211, 221 of the webs 210, 220 which point towards the recess 202 are situated, in portions, behind the remaining portion of the second layer or the edges 380 thereof between the recesses 301, 302 of the second layer 300 and thus produce a form-fit connection between the two layers 200, 300.

Figure 1D:
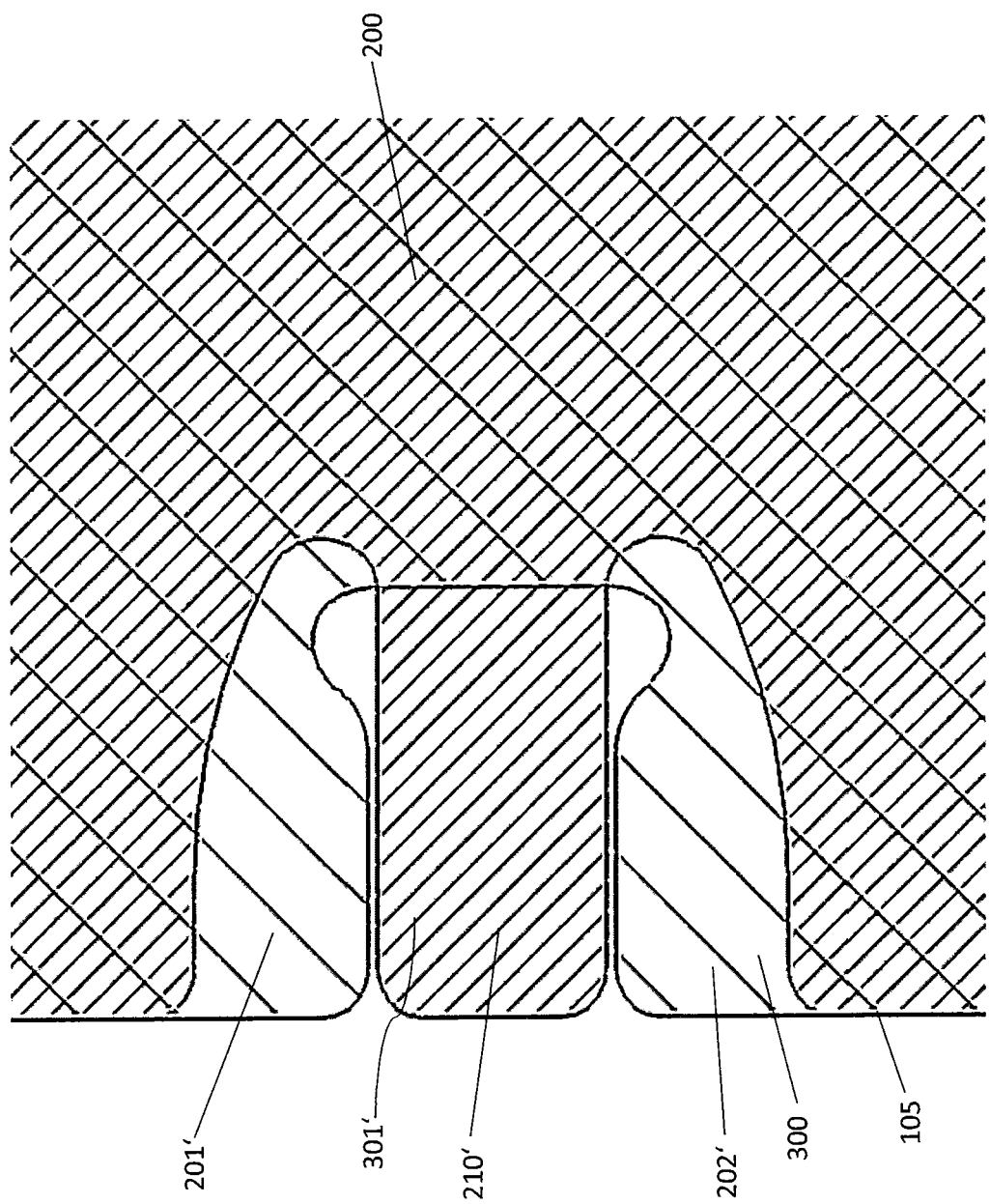
FIG. 1d a plan view/phantom view on/through a further connecting point according to the invention.

FIG. 1d shows a plan view/phantom view on or through a further connecting point 110 according to the invention. In this embodiment, merely two recesses 201', 202' are configured in the first layer 200 so that only one web 210' is configured between them. Here also, the second layer 300 has a recess 301' which is situated below the web 210' in plan view on the first layer 200 so that the web 210' can touch the flange of the housing lower part in the reshaped state.

Figure 1E:
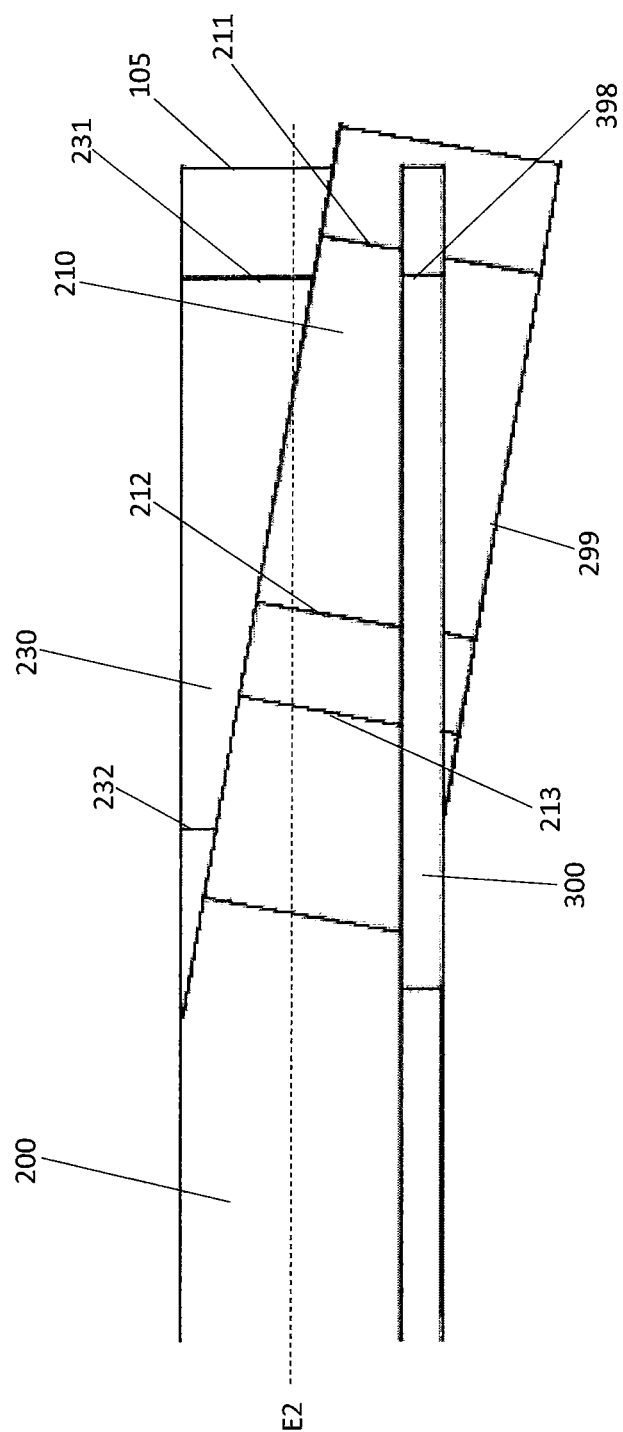
FIG. 1e a side view on a connecting point according to the invention.

FIG. 1e shows a connecting point 110 according to the invention in side view which can concern the connecting point of FIGS. 1a to 1c or the connecting point of FIG. 1d. Here, behind the deformed web 210 of the first layer 200, the neutral fibre E2' of which is indicated with a dot-dash line, the undeformed portion 230 of the first layer 200 is sketched, the neutral fibre E2 of which is indicated with a broken line. The lower surface 299 of the first layer 200 of the web 210, observed from the side, is situated for the most part below the second layer 300. The vertical edges 211, 212, 213, 231, 232, 398 indicate edges which are produced because of the rounded side faces. The two neutral fibres E2 and E2' span an obtuse angle α of just 170°.

FIG. 2a shows a plan view on a cover 100 with an essentially rectangular contour so that two longer sides 101a, 101c of the cover 100 and two shorter sides 101b, 101d of the cover 100 are produced, the transitions between the sides or the corners 102a, 102b, 102c, 102d of the rectangular cover 100 being respectively rounded-off. A circumferential reinforcing bead 130 extends parallel to the sides of the cover 100 so that a circumferential edge region 140 is produced between the outer circumferential edge 105 and the reinforcing bead 130. In the edge region, in total eight connecting points according to the invention 110a, 110b, 110c, 110d, 110e, 110f, 110g, 110h are disposed, respectively two connecting points 110 being disposed at each of the four sides 101a, 101b, 101c, 101d of the cover 100. The illustration of these connecting points 110 is equivalent to the illustration of FIG. 1c. In total eight through-borings 120a, 120b, 120c, 120d, 120e, 120f, 120g, 120h are situated in the edge region, which serve for screwing the cover 100 to the flange of the housing lower part. In the edge region 140 of each of the two shorter sides 101b, 101d of the cover 100, a through-boring 120d, 120h is thereby situated and, in the edge region of each of the two longer sides of the cover 100, respectively three connecting points 120a, 120b, 120c, 120e, 120f, 120g. Connecting points 110a, 110b, 110c, 110d, 110e, 110f, 110g, 110h and through-borings 120a, 120b, 120c, 120d, 120e, 120f, 120g, 120h are disposed respectively alternately relative to each other so that one connecting point 110 and one through-boring are disposed alternately in the edge region 140. On one of the oblong sides 101c there are located in addition two ventilation points 150a, 150b, for which respectively four small openings 250a, 250b are introduced into the first layer 200 of the housing cover 100. Below that, not visible in the Figure, there is situated a water-impermeable but water vapour-permeable PTFE membrane and also a recess according to the invention of the second layer of the cover 100 which enables a through-path for gas between the interior of the housing and the environment.

Figure 2B:
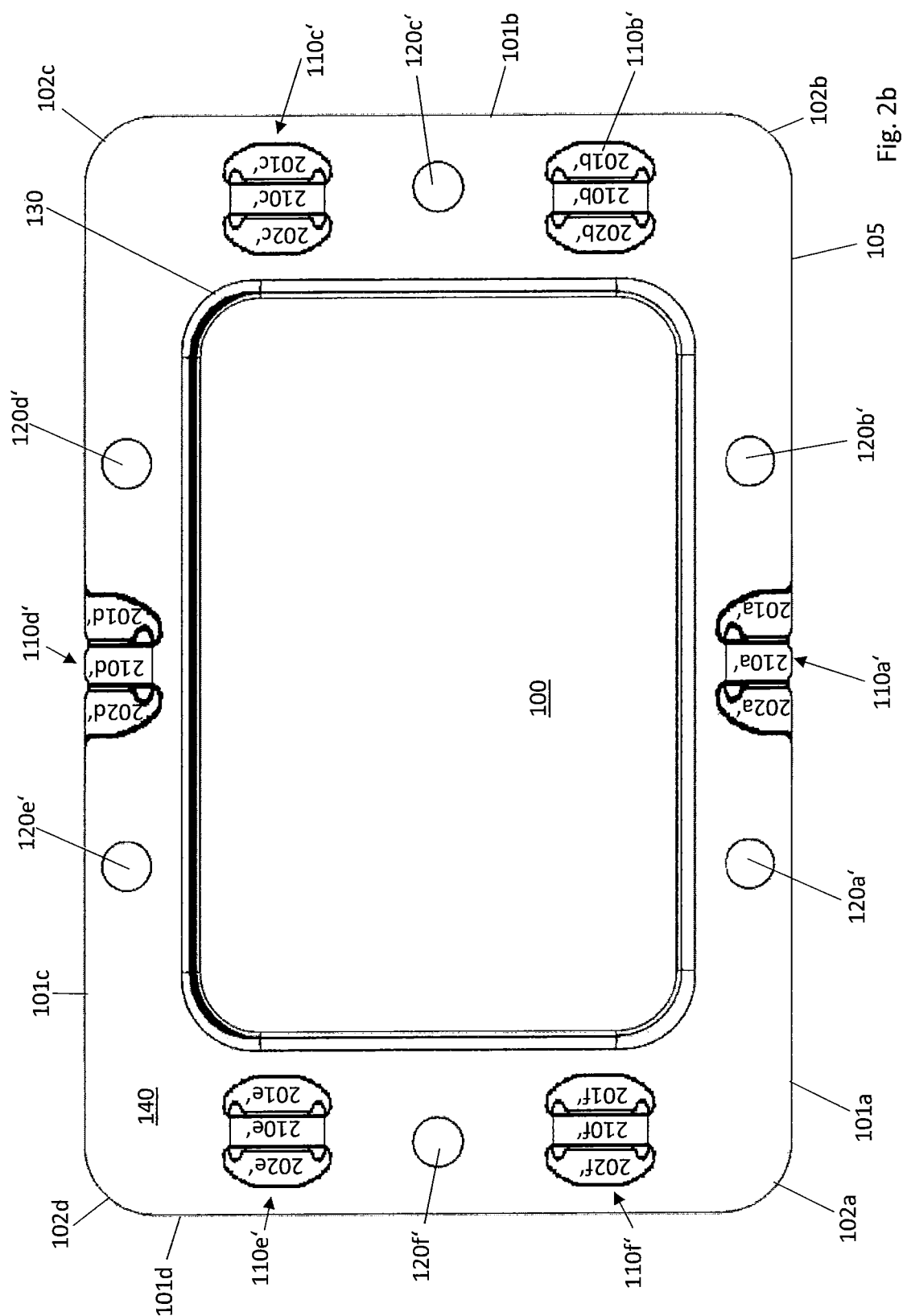
FIG. 2b a plan view on a further cover with connecting points according to the invention.

FIG. 2b shows a further housing cover 100 according to the invention in plan view. The essential difference here from FIG. 2a is that the connecting points 110a', 110b', 110c', 110d', 110e', 110f' are designed differently here. Connecting points 110a', 110d' are configured adjacent to the outer circumferential edge 105 of the housing cover 100. In contrast to the previous embodiments, the connecting points 110a', 110d' have however respectively merely two material recesses 201a', 202a', 201d', 202d' of the first layer 200 so that only one web 210a', 210d' of the first layer 200 is configured, which is reshaped in order to produce an electrically conductive connection. The connecting points 110b', 110c', 110e', 110f' are not disposed at the outer circumferential edge 105 of the housing cover 100 but are situated in the centre on the edge region 140 of the housing cover 100. Here, respectively two material recesses 201b', 202b', 201c', 202c', 201e', 202e', 201f', 202f' are cut out in the first layer 200 per connecting point 110b', 110c', 110e', 110f' so that a web 210b', 210c', 210e', 210f' is configured between them. The web 210b', 210c', 210e', 210f' is respectively embossed so that the web 210b', 210c', 210e', 210f', compared with the non-embossed state, has undergone a lengthening and extends offset relative to the first layer plane 200 of the cover 100 so that contact with the flange of the housing lower part can be produced. In addition, in this embodiment of the connecting point 110b', 110c', 110e', 110f', no end of the web forms a part of the outer circumferential edge 105.

FIGS. 2a and 2b clarify that the placing of the connecting points 110, 110' can be chosen relatively freely. In the case of the through-borings 120 for fixing means, this is generally not relevant since their first object exists in the connection of the relevant components. This shows that, even if earthing is possible via fixing means, this always has the disadvantage that the positions of the fixing means cannot be optimised with respect to the earthing. In contract thereto, the connecting points according to the invention offer here many degrees of freedom. In particular, also the number of connecting points is less restricted than the number of through-borings for fixing means.

Figure 3:
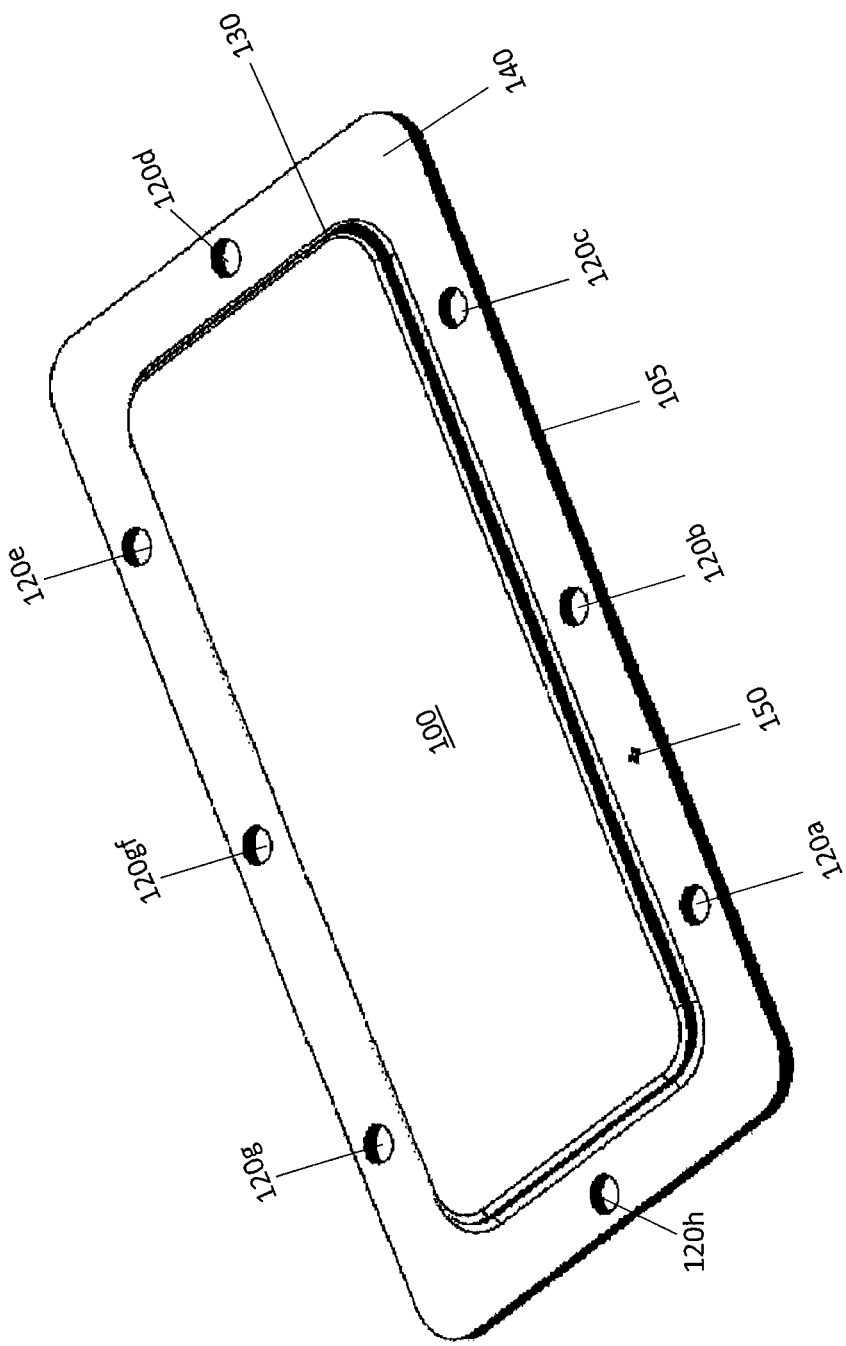
FIG. 3 a diagonal view on a housing cover.

FIG. 3 shows a diagonal view on a further housing cover 100. The housing cover 100 has no connecting points according to the invention, however the spatial shape of such a housing cover 100 is clarified. Reinforcing bead 130, edge region 140 of the cover 100, through-borings 120a, 120b, 120c, 120e, 120f, 120g and a ventilation point 150 are illustrated in the edge region.

Figure 4:
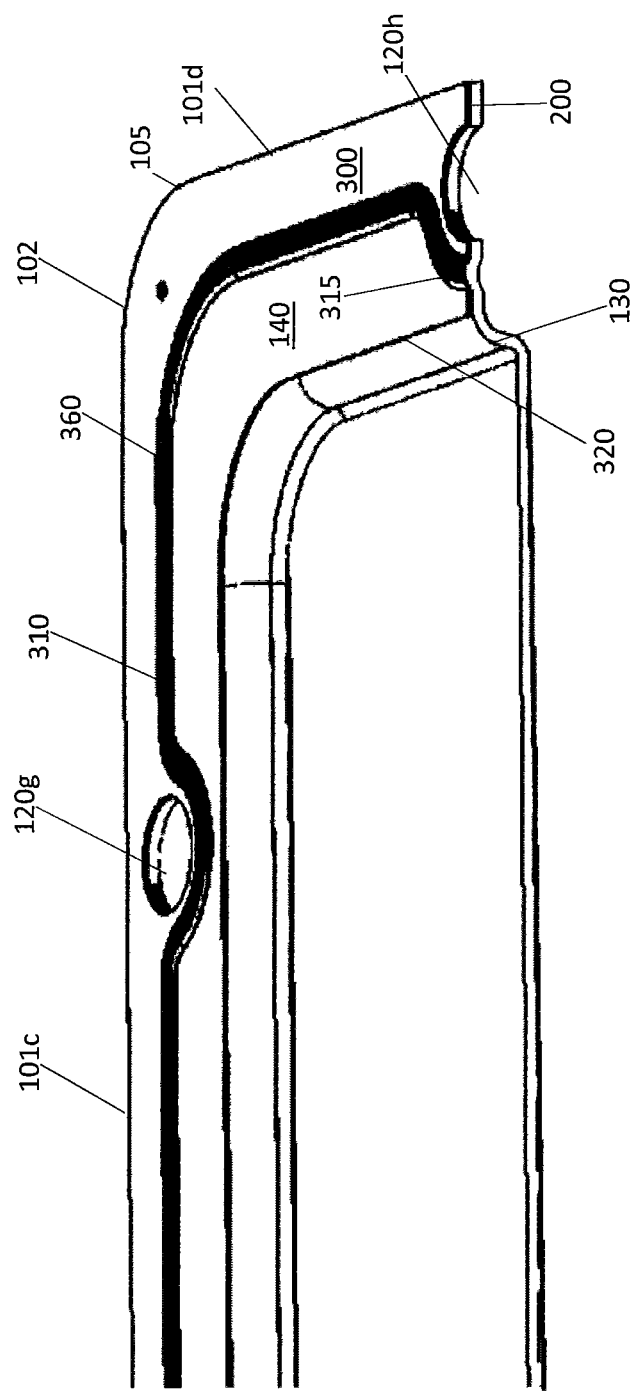
FIG. 4 a detailed view on an edge portion of a cover.

FIG. 4 shows a diagonal view of a section of the housing cover 100 according to the invention which illustrates the housing cover 100, viewed from the inside. In the edge region 140, which extends between the outer circumferential edge 105 of the cover 100 and the reinforcing bead 130 of the first layer 200, a second layer 300 is situated which surrounds with an inner edge 320 in a frame-shape and is disposed on the inside of the cover 100. It can be detected in the section that the second layer 300 has a substantially lesser material thickness than the first layer 200. In addition, a sealing bead 310 is situated on the second layer 300, which is disposed circumferentially in the edge region 140, the bead top 315 being aligned in the direction of the flange of the housing lower part. The through-borings 120g, 120h extend outside that region which is surrounded by the bead 310 in order to increase the system impermeability. The elastomeric coating 360 of the bead 310 is thereby illustrated in a dark colour.

Figure 5:
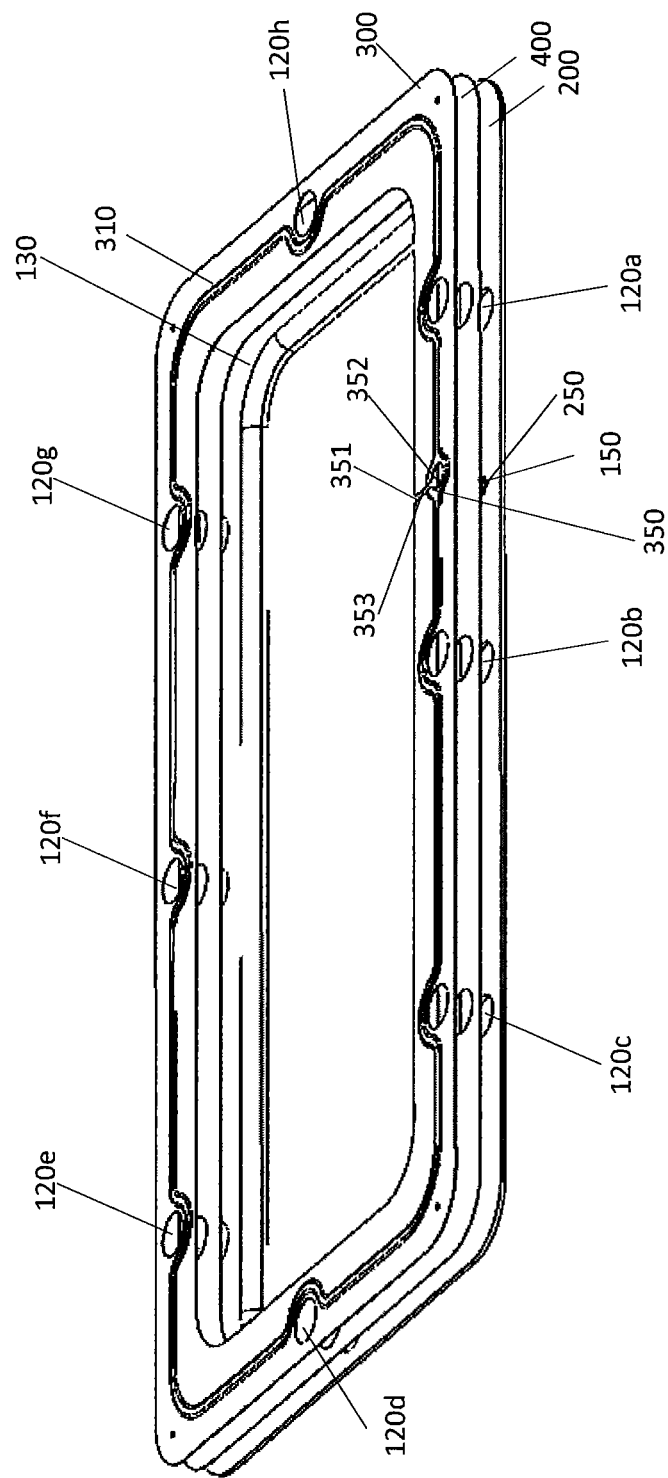
FIG. 5 an exploded illustration of three layers of a housing cover.

FIG. 5 shows the layer structure in an exploded illustration of the housing cover 100 according to the invention which is illustrated viewed from the inside. Here three different layers of the housing cover 100 are illustrated. In addition to the metallic first layer 200 and the metallic second layer 300, in addition a third layer 400 which is situated between these two layers and made of PTFE is illustrated. Both the second layer 300 and the PTFE layer 400 are configured circumferentially in the edge region of the housing cover 100. All the layers 200, 300, 400 are penetrated by the through-borings 120a, 120b, 120c, 120d, 120e, 120f, 120g, 120h in the edge region 140. The sealing bead 310 on the second metallic layer 300 is configured such that all of the through-borings 120a, 120b, 120c, 120d, 120e, 120f, 120g, 120h, viewed in plan view on the cover 100, extend outside the circumferential edge of the sealing bead 310. In addition, the Figure shows a ventilation point 150 with through-openings 250 in the first layer 200 and also a material recess 350 in the second layer 300 which has a ventilation channel 351 which connects the inner region of the housing to the round recess 352 of the second layer 200, which recess is situated below the through-openings 250 of the first layer 200. The PTFE layer 400 does not however have an opening adjacent to the ventilation point 150. In the region of the ventilation point 150, the sealing bead 310 extends circumferentially around the round recess 352 of the material recess 350 of the second layer 300, interrupted merely at that point 353 at which the channel 351 extends, which connects the round recess 352 to the inner region of the housing.

Figure 6:
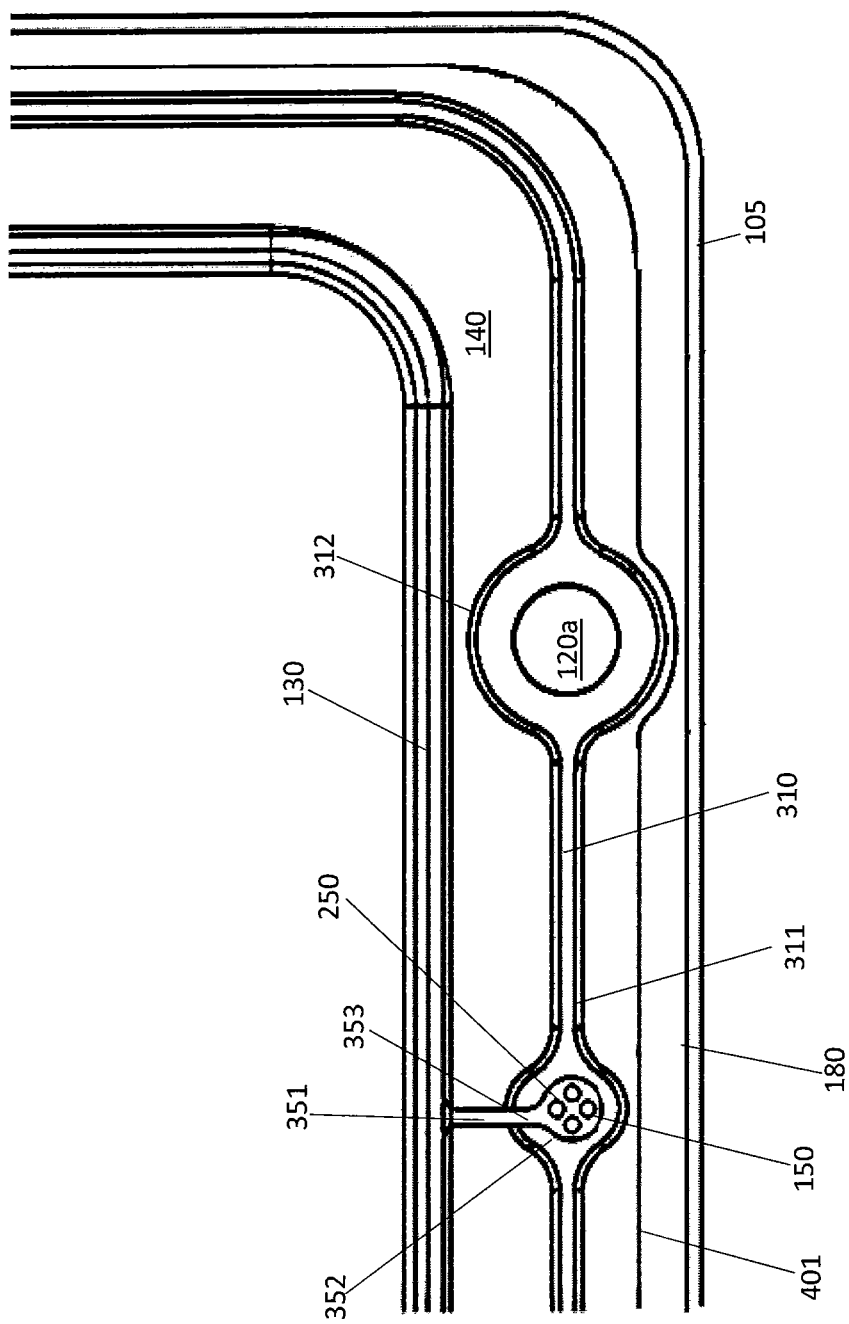
FIG. 6 a schematic plan view on an edge region of a housing cover with ventilation point; and also FIG. 7 two schematic illustrations of housings with housing covers.

FIG. 6 shows a schematic plan view on the edge region 140 of a cover 100, viewed from the inside of the housing. The sealing bead 310 extends, with its two bead members 311, 312, circumferentially around the round recess 352 of the second layer 300, however is not configured at that position 353 at which the channel-like recess 351 of the second layer 300 extends. Likewise, illustrated schematically, are the through-openings 250 of the first layer 200 in the region of the ventilation point 150. The illustration shows, furthermore, the reinforcing bead 130 and also a through-boring 120a. The latter deviates from the through-borings of the preceding embodiments by, similarly to the ventilation point 150, the bead 310 branching here in the region of the through-boring 120a and the two bead members 311, 312 respectively extending to one side of the through-boring 120a in the shape of a half bead. The line 401 indicates the outer edge of the PTFE membrane 400, the line 180 the course of a circumferential weld seam which connects the layers 200 and 300 together. The PTFE membrane 400 is therefore recessed in the region of the weld seam 180.

Figure 7B:
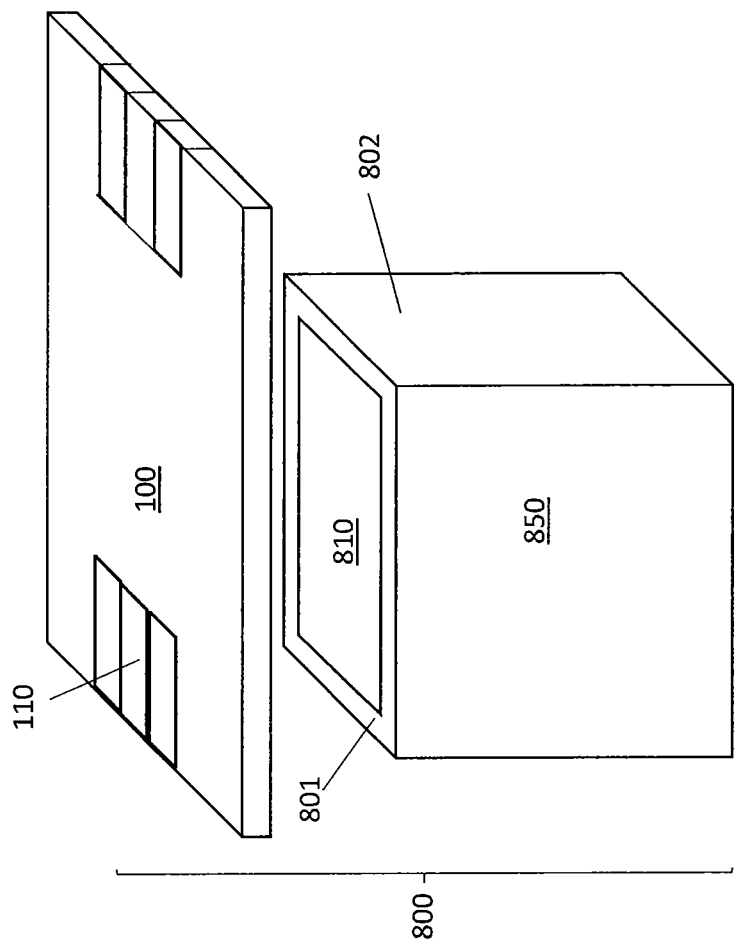
Figure 7A:
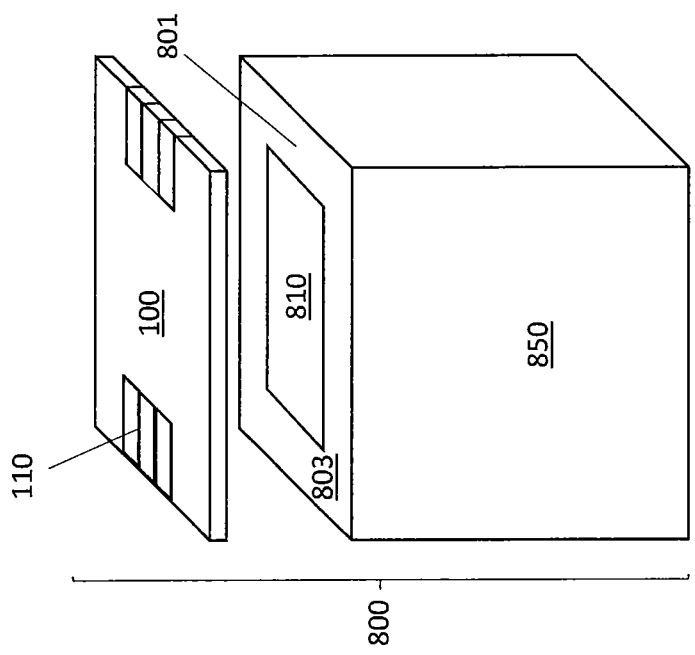

FIG. 7 illustrates, in the partial FIGS. 7a and 7b, highly schematically and in an exploded illustration, respectively a housing 800 according to the invention with a housing lower part 850 and a housing cover 100. The housing cover 100 is fitted on the housing lower part 850 of the housing 800 such that the connecting points 110 come to lie on the surface 803, parallel to the layers of the housing cover 100, of the flange 801 of the housing lower part 850 (FIG. 7a) or else such that the connecting points 110 engage at least in portions around the housing part 850 in the mounted state and, on the side of the outer circumferential edge 802 of the flange 801, touch the housing 800 (FIG. 7b).

The invention claimed is:

1. A housing cover having at least one first layer which comprises electrically conductive material and has a circumferential edge region extending along its outer circumferential edge, and also having a second layer which is configured to extend circumferentially at least along the edge region, wherein
the first layer in the edge region has at least one connecting point in which the first layer has at least one material recess such that a web is formed, and in that second layer adjacent to the web has a through-opening.

2. The housing cover according to claim 1, wherein the second layer forms a frame extending along the edge region.

3. The housing cover according to claim 1, wherein the first layer, at at least one connecting point, has two material recesses, between which a web is formed.

4. The housing cover according to claim 1, wherein the through-opening of the second layer is formed adjacent to the web in the direction perpendicular to the layer plane of the first and second layer.

5. The housing cover according to claim 1, wherein the web of the first layer is cranked such that, at least in portions, viewed from the first layer, passes through the through-opening of the second layer and at least the side of the web, orientated away from the first layer, extends at least in portions behind all of the layers of the housing cover.

6. The housing cover according to claim 5, wherein the first layer and/or the second layer is embossed at the side such that at least one free edge of the web extends at least in portions behind the second layer and engages behind at least one portion of the edge of the through-opening of the second layer in order to produce a form-fit acting perpendicular to the layer plane of the layers.

7. The housing cover according to claim 6, wherein the neutral fibre of the cranked web region penetrates the plane of the second layer, and the first layer adjacent to the through-opening of the second layer is reshaped such that the neutral fibre (E2) of the second layer lies in this region at least partially inside the first layer, the first and/or second layer being embossed at the side such that at least one free edge of the web extends at least in portions behind the second layer and engages behind the latter in order to produce a form-fit acting perpendicular to the layer plane.

8. The housing cover according to claim 1, wherein the at least first and second layer are connected together in the edge region, in a force-fit manner, in a positive-fit manner and/or integrally, including via f a weld connection circumferentially along the outer circumferential edge of the edge region.

9. The housing cover according to claim 1, wherein the web, in plan view on the layer plane of the first layer, has a straight or curved course and/or a round, square or oval outer contour.

10. The housing cover according to claim 1, wherein the web, in plan view on the layer plane of the first layer, is configured symmetrically relative to its longitudinal axis.

11. The housing cover according to claim 10, wherein the first layer comprises metal or consists thereof.

12. The housing cover according to claim 1, wherein the first layer has a reinforcing bead which is configured circumferentially and/or offset relative to the outer edge of the cover, including the region between the reinforcing bead and the outer circumferential edge of the first layer forming the edge region of the first layer.

13. The housing cover according to claim 1, wherein at least one of the layers of the housing cover has a bead which is disposed, viewed in the direction perpendicular to the layer plane, adjacent to the edge region along the circumferential edge of the first layer.

14. The housing cover according to claim 1, wherein, in the edge region, at least one screw hole which penetrates all the layers of the housing cover is provided, including the at least one screw hole being configured outside the region surrounded by a circumferential bead.

15. The housing cover according to claim 1, wherein at least the first and/or the second layer is coated to be electrically insulating or electrically insulating, at least in regions, the insulating coating being situated on the side of the first layer, orientated towards the second layer, and/or on the side of the second layer, orientated towards the first layer, and/or on the side of the second layer, orientated away from the first layer.

16. The housing cover according to claim 1, wherein at least between the edge region of the first layer and the second layer, a third layer made of a material which is gas-permeable perpendicular to the layer plane is disposed, wherein, in the edge region, including inside a region surrounded by a circumferential bead, the first layer has at least one through-opening and the second layer has a recess which extends from the (inner) region surrounded by the edge region to below the through-opening in the first layer.

17. The housing cover according to claim 6, wherein the third layer is configured circumferentially at a spacing from the outer circumferential edge of the edge region and from a weld seam or alternative connection situated there.

18. The housing cover according to claim 17, wherein the third layer is a membrane made of polytetrafluoroethylene (PTFE).

19. The housing cover according to claim 1, wherein the contour of the cover, in plan view on the layer planes, is configured non-symmetrically and/or as free form.

20. The housing having a housing lower part which has at least one circumferential flange in the closure plane of the housing, and having a housing cover according to claim 1, wherein, the housing cover being supported circumferentially on the flange at least in regions with its end region and being connected to the at least one flange, wherein the web of the first layer is offset at at least one connecting point such that, at least in portions, it passes through the through-opening of the second layer, touches the at least one flange of the housing lower part and connects together the web and the at least one flange to be electrically conductive.

21. The housing according to claim 20, wherein the web touches the flange on the side of the flange which extends parallel to the layers of the housing cover or in that the web is configured in a portion of the edge region which is situated outside the region surrounded by the flange, the offset web touching the flange on the side of the outer circumferential edge of the flange.

22. The housing according to claim 21, wherein the housing lower part and housing cover are connected together in the flange region via detachable connecting elements, including screws.

23. The housing according to claim 22, wherein at least two connecting points, the webs of which extend in different directions, are disposed at a spacing from each other in the layer plane of the first layer.

* * * * *